US010747998B2

(12) United States Patent
Gopalan (10) Patent No.: US 10,747,998 B2
(45) Date of Patent: *Aug. 18, 2020

(54) STRUCTURE FROM MOTION FOR DRONE VIDEOS

(71) Applicant: AT&T Intellectual Property I, L.P., Atlanta, GA (US)

(72) Inventor: Raghuraman Gopalan, Dublin, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/238,349

(22) Filed: Jan. 2, 2019

(65) Prior Publication Data

US 2019/0138784 A1    May 9, 2019

Related U.S. Application Data

(63) Continuation of application No. 15/455,745, filed on Mar. 10, 2017, now Pat. No. 10,192,111.

(51) Int. Cl.
*G06K 9/00*    (2006.01)
*G06T 7/579*    (2017.01)
(Continued)

(52) U.S. Cl.
CPC ....... *G06K 9/0063* (2013.01); *G06K 9/00208* (2013.01); *G06K 9/6202* (2013.01);
(Continued)

(58) Field of Classification Search
CPC .... G06K 9/66; G06K 9/6202; G06K 9/00208; G06K 9/0063; G06T 2207/20081;
(Continued)

(56) References Cited

U.S. PATENT DOCUMENTS 7,571,051 B1    8/2009    Shulman
7,747,364 B2    6/2010    Linden et al.
(Continued)

FOREIGN PATENT DOCUMENTS

CN    105184863    * 12/2015    ............ G60T 17/05
CN    105184863 A    12/2015
(Continued)

OTHER PUBLICATIONS

James, Mike R. et al., "Mitigating Systematic Error in Topographic Models Derived From UAV and Ground-Based Image Networks", Earth Surface Processes and Landforms; Earth Surf. Process. Landforms 39,, May 28, 2014, 1413-1420.
(Continued)

*Primary Examiner* — Amara Abdi
(74) *Attorney, Agent, or Firm* — Guntin & Gust, PLC; Jay H. Anderson (57) ABSTRACT

Aspects of the subject disclosure may include, for example, a method comprising obtaining, by a processing system including a processor, first and second models for a structure of an object, based respectively on ground-level and aerial observations of the object. Model parameters are determined for a three-dimensional (3D) third model of the object based on the first and second models; the determining comprises a transfer learning procedure. Data representing observations of the object is captured at an airborne unmanned aircraft system (UAS) operating at an altitude between that of the ground-level observations and the aerial observations. The method also comprises dynamically adjusting the third model in accordance with the operating altitude of the UAS; updating the adjusted third model in accordance with the data; and determining a 3D representation of the structure of the object, based on the updated adjusted third model. Other embodiments are disclosed.

20 Claims, 8 Drawing Sheets

(51) Int. Cl.
  *G06T 17/00* (2006.01)
  *G06K 9/62* (2006.01)
  *G06K 9/66* (2006.01)
  *G06T 17/05* (2011.01)

(52) U.S. Cl.
  CPC ............. *G06K 9/66* (2013.01); *G06T 7/579* (2017.01); *G06T 17/00* (2013.01); *G06T 17/05* (2013.01); *G06T 2207/10032* (2013.01); *G06T 2207/20081* (2013.01)

(58) Field of Classification Search
  CPC .......... G06T 2207/10032; G06T 17/00; G06T 17/05; G06T 7/579
  See application file for complete search history.

(56) References Cited

U.S. PATENT DOCUMENTS

| | | | |
|---|---|---|---|
| 8,208,717 B2* | 6/2012 | Xiao | G06K 9/621 345/420 |
| 8,467,628 B2 | 6/2013 | Coffman et al. | |
| 8,855,846 B2 | 10/2014 | Grzywna et al. | |
| 9,092,866 B1 | 7/2015 | Li | |
| 9,097,532 B2 | 8/2015 | Lukas et al. | |
| 9,201,424 B1 | 12/2015 | Ogale | |
| 9,482,524 B2 | 11/2016 | Metzler et al. | |
| 9,489,635 B1 | 11/2016 | Zhu et al. | |
| 9,495,764 B1 | 11/2016 | Heinly et al. | |
| 9,535,423 B1 | 1/2017 | Debreczeni et al. | |
| 9,536,320 B1 | 1/2017 | Prince | |
| 9,898,821 B2* | 2/2018 | Metzler | G05D 1/0094 |
| 2011/0181589 A1* | 7/2011 | Quan | G06T 17/05 345/420 |
| 2012/0176497 A1* | 7/2012 | Shadmi | G01C 21/00 348/144 |
| 2013/0250050 A1* | 9/2013 | Kanaujia | H04N 13/106 348/42 |
| 2015/0036916 A1 | 2/2015 | Mundhenk et al. | |
| 2015/0268050 A1 | 9/2015 | Laine et al. | |
| 2015/0304558 A1 | 10/2015 | Horak | |
| 2015/0310335 A1* | 10/2015 | Fan | G06N 20/00 706/12 |
| 2016/0005234 A1 | 1/2016 | Boivin et al. | |
| 2016/0070265 A1 | 3/2016 | Liu et al. | |
| 2017/0205826 A1* | 7/2017 | Smith | B64C 39/024 |
| 2018/0260607 A1 | 9/2018 | Gopalan | |

FOREIGN PATENT DOCUMENTS

| | | | | |
|---|---|---|---|---|
| EP | 2483828 A1 | 8/2012 | | |
| JP | 6039050 B1 | 12/2016 | | |
| JP | 2017116453 | * | 6/2017 | B64C 13/18 |
| JP | 2017116453 A | 6/2017 | | |
| WO | 2013182232 A1 | 12/2013 | | |
| WO | 2016053438 A3 | 6/2016 | | |

OTHER PUBLICATIONS

Leswing, Kif, "DJI's Powerful New Computer Will Lead to Better Drone Apps", A Computer Specificall for Drones; http://fortune.com/2015/11/02/djimanifoldcomputer/, Nov. 2, 2015, 1-2.

Lhuillier, Maxime, "Incremental Fusion of Structure-From-Motion and GPS Using Constrained Bundle Adjustments", http://ieeexplore.ieee.org/xpl/tocresult.jsp?isnumber=6332439, 1-20, 2012.

Malisiewicz, Tomasz, "The Future of Real-Rime Slam and Deep Learning vs Slam", Tombone's Computer Vision Blog; http://www.computervisionblog.com/2016/01/whyslammattersfutureofrealtime.html, Jan. 13, 2016, 1-14.

Mancini, Francesco et al., "Using Unmanned Aerial Vehicles (UAV) for High-Resolution Reconstruction of Topography: The Structure From Motion Approach on Coastal Environments", Remote Sensing; www.mdpi.com/journal/remotesensing, Dec. 19, 2013, 6880-6898.

PIX4D, "Pix4Dmapper Pro: Software for Professional Drone-Based Mapping, Purely From Images", Version 3.1, 1-5, Jan. 31, 2017.

* cited by examiner

STRUCTURE FROM MOTION FOR DRONE VIDEOS

CROSS REFERENCE TO RELATED APPLICATIONS

This application is a continuation of U.S. application Ser. No. 15/455,745, filed Mar. 10, 2017, which is incorporated herein by reference in its entirety.

FIELD OF THE DISCLOSURE

The subject disclosure relates to a system and method for using Structure from Motion (SfM) techniques for processing video data captured by drones (small unmanned aircraft).

BACKGROUND

Structure from Motion (SfM) techniques are used to establish correspondence between a predefined three-dimensional (3D) model of an object and two-dimensional (2D) images of the object. Models typically are developed for use with images from ground-based video equipment (ground-plane video) or images from video equipment installed in aircraft (aerial-plane video). Drones, however, generally operate at intermediate heights.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for using Structure from Motion (SfM) techniques to generate a 3D representation of an object observed by a drone. Other embodiments are described in the subject disclosure.

One or more aspects of the subject disclosure include a method comprising obtaining, by a processing system including a processor, a first model and a second model for a structure of an object; the models are based respectively on a ground-level or near-ground-level observations of the object and aerial observations of the object. The method also comprises determining model parameters for a three-dimensional (3D) third model of the object based on the first model and the second model; the determining comprises a transfer learning procedure using a manifold. The method further comprises obtaining data representing a third plurality of observations of the object; the data is captured at an airborne unmanned aircraft system (UAS) operating at an altitude greater than that of the ground-level observations and less than that of the aerial observations. The method also comprises dynamically adjusting the third model in accordance with the operating altitude of the UAS; updating the adjusted third model in accordance with the data; and determining a 3D representation of the structure of the object, based on the updated adjusted third model.

One or more aspects of the subject disclosure include a device comprising a processing system including a processor, and a memory that stores executable instructions; the instructions, when executed by the processing system, facilitate performance of operations. The operations comprise obtaining a first model and a second model for a structure of an object; the models are based respectively on a ground-level or near-ground-level observations of the object and aerial observations of the object. The operations also comprise determining model parameters for a three-dimensional (3D) third model of the object based on the first model and the second model; the determining comprises a transfer learning procedure using a manifold. The operations further comprise obtaining data representing a third plurality of observations of the object; the data is captured at an airborne unmanned aircraft system (UAS) operating at an altitude greater than that of the ground-level observations and less than that of the aerial observations; the data comprises two-dimensional (2D) video images of the object. The operations also comprise determining correspondence parameters representing a correspondence between the data and the third model; updating the correspondence parameters in accordance with the data; dynamically adjusting the third model in accordance with the operating altitude of the UAS; updating the adjusted third model in accordance with the data; and determining a 3D representation of the structure of the object, based on the updated adjusted third model.

One or more aspects of the subject disclosure include a machine-readable storage medium comprising executable instructions that, when executed by a processing system including a processor, facilitate performance of operations. The operations comprise obtaining a first model and a second model for a structure of an object; the first model is based on a first plurality of observations comprising ground-level or near-ground-level observations of the object, and the second model is based on a second plurality of observations comprising aerial observations of the object. The operations also comprise determining model parameters for a three-dimensional (3D) third model of the object based on the first model and the second model; the determining comprises a transfer learning procedure. The operations further comprise obtaining data representing a third plurality of observations of the object; the data is captured at an airborne unmanned aircraft system (UAS) operating at an altitude greater than that of the first plurality of observations and less than that of the second plurality of observations. The operations also comprise dynamically adjusting the third model in accordance with the operating altitude of the UAS; updating the adjusted third model in accordance with the data; and determining a 3D representation of the structure of the object, based on the updated adjusted third model and the operating altitude.

Figure 1:
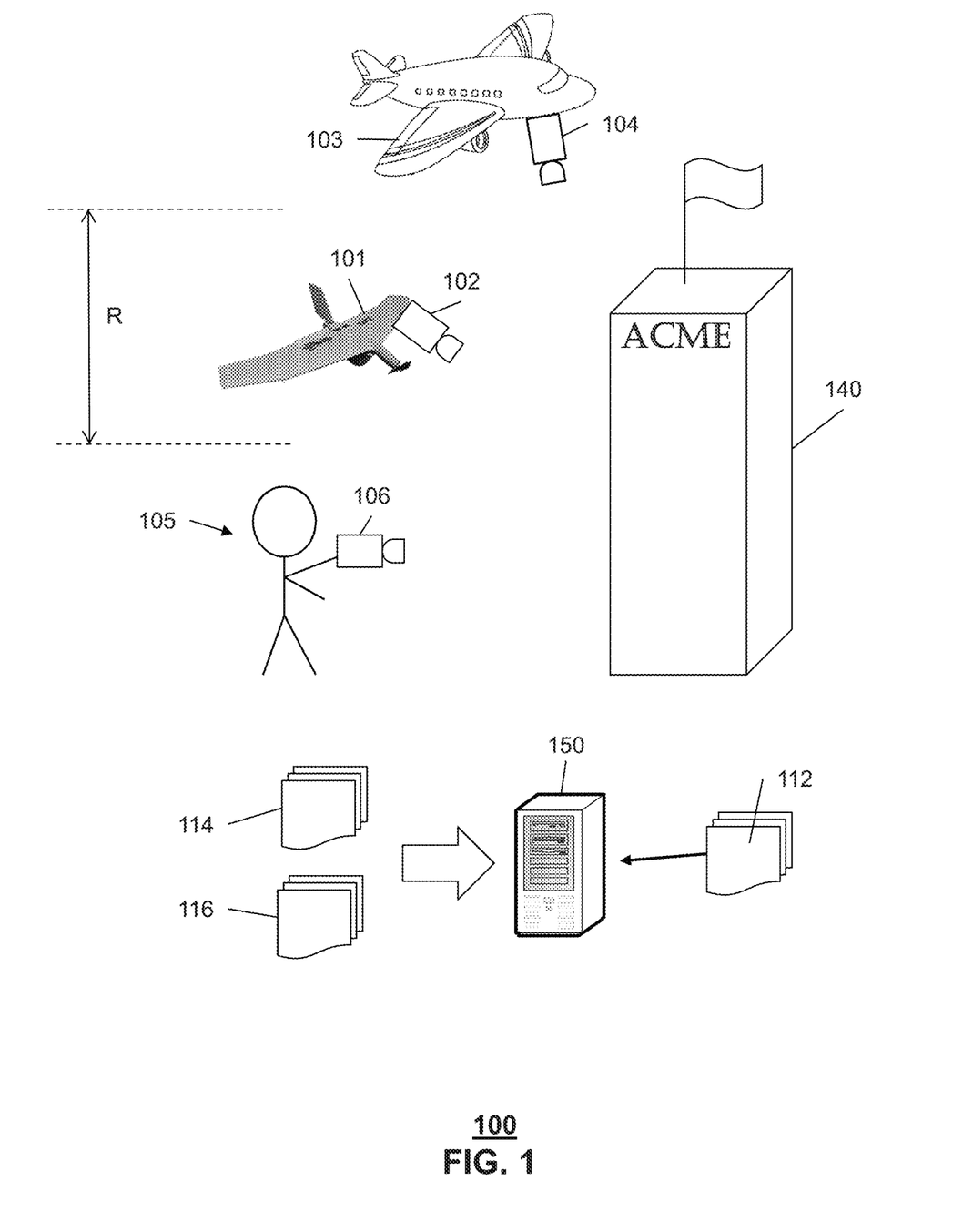
FIG. 1 schematically illustrates collecting and processing ground-plane video, aerial-plane video, and drone video image data, in accordance with embodiments of the disclosure.

FIG. 1 schematically illustrates a system 100 in which observations (video data) are collected relating to an object of interest (e.g. building 140). A drone 101, an aircraft 103, and a ground-based operator 105 can acquire images of the building using video equipment 102, 104, 106 respectively. As shown in FIG. 1, drone 101 operates above ground level in an operating range R (in this embodiment, a range of about 100 feet to 300 feet above ground). Aircraft 103 typically operates at a height of about 1000 feet or higher. The image data 112, 114, 116 collected at the different heights will generally present different perspectives and different levels of detail.

When comparing ground-plane, aerial-plane and drone video images of the same object, it will be appreciated that drone videos typically have more variation than aerial-plane videos due to the drone's lower operating height, and can include more environmental effects than ground-plane videos (e.g. due to air drift and different weather phenomena at different heights).

In an embodiment, the video observations (2D images) 112 from the equipment 102 of drone 101 are monitored and compared with a pre-constructed 3D model of the scene being observed by the drone (in this embodiment, building 140). The 3D model is derived from model parameters for the scene based on the ground-plane observations 116 from equipment 106 of ground-based operator 105, and the aerial-plane observations 114 from the equipment 104 of aircraft 103. In an embodiment, the model parameters are generated using a transfer learning technique, as detailed below.

A machine-learning algorithm, executing on processing system 150, can then be used to obtain SfM model parameters applicable to the drone's operating range. Correspondence parameters (relating to the differences between the 3D model and the 2D observations 112 from the drone) are adjusted to minimize the error between the model and the observations, so that a 3D representation of the object observed by the drone can be generated.

Figure 2:
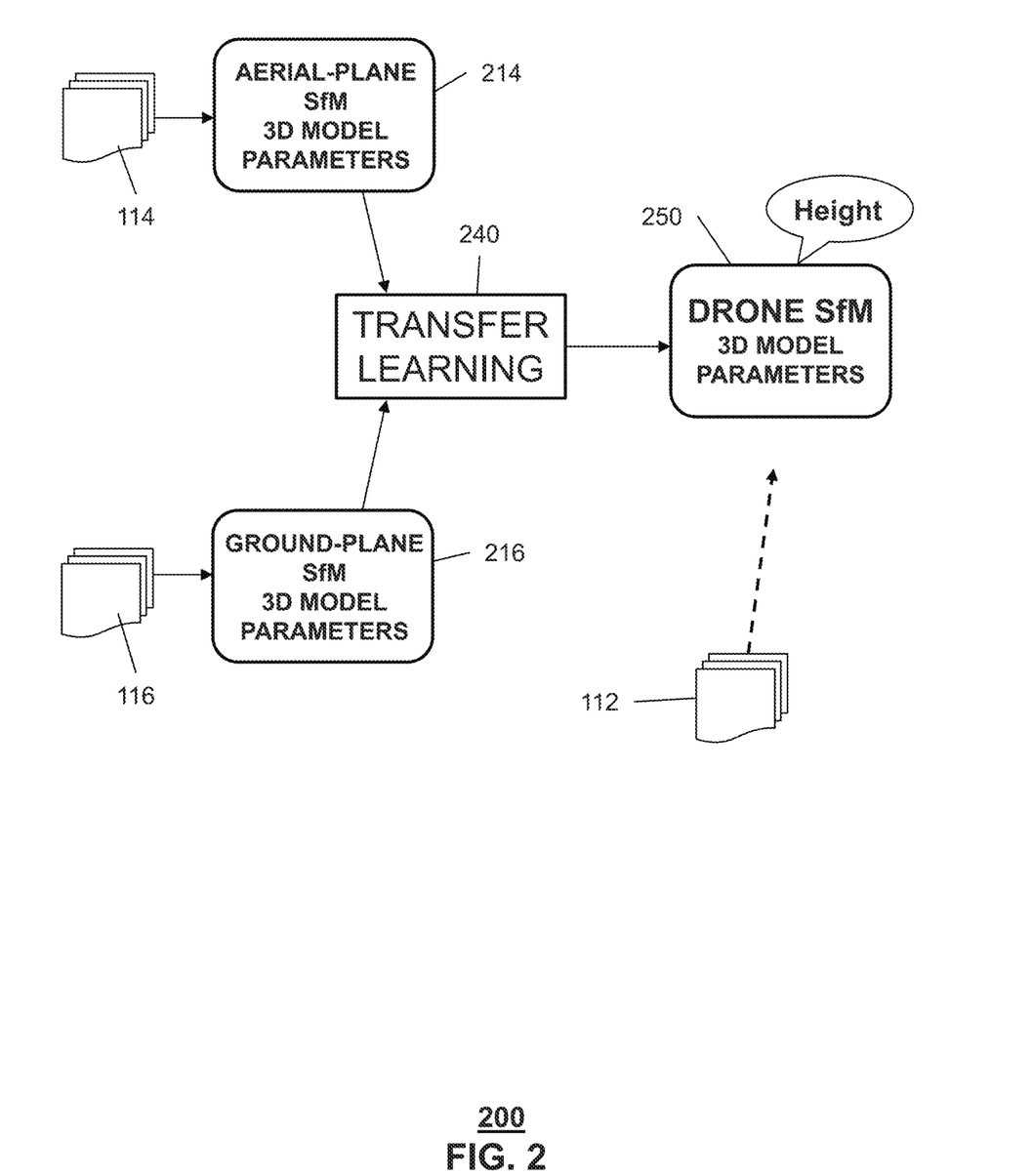
FIG. 2 schematically illustrates a procedure for generating a 3D SfM model for use in processing drone video data, in accordance with embodiments of the disclosure.

FIG. 2 schematically illustrates a procedure 200 for generating a 3D SfM model applicable to drone video observations, using the system of FIG. 1. In this embodiment, the image data 114 from the aircraft-borne equipment 104 is used to generate aerial-plane SfM model parameters 214, and the image data 116 from the ground-based equipment 106 is used to generate ground-plane SfM model parameters 216. At a given height above ground, the optimal 3D model (the best model for use by the drone at that height) can be derived from the SfM model parameters for that height. However, those parameters (and thus the model itself) vary with height in a non-linear fashion.

In this embodiment, a transfer learning approach is used on a Grassmannian manifold to determine the height-dependent 3D model parameters. As is understood in the art, a Grassmannian manifold is a particular category of a general non-Euclidean Riemannian manifold; the Grassmannian manifold operates on subspaces of data representations. In this embodiment, the subspace spanned by the SfM 3D model parameters for the ground plane define one endpoint of a non-linear path on the Grassmannian manifold, and the subspace spanned by the SfM 3D model parameters for the aerial plane define the other endpoint.

In this embodiment, transfer learning algorithm 240 identifies an optimal non-linear path between the endpoints, subject to various constraints (e.g. a continuous and consistent path, physical boundaries of the 3D area of interest, a curved earth surface, etc.). Points along this path can then be sampled, corresponding to various heights above ground, to determine optimal SfM parameters 250 for those heights. A 3D model of the object is thus available for comparison with the 2D video data 112 collected by the drone at a given height.

In an embodiment, system 150 continuously monitors the operating height of the drone, and dynamically adjusts the 3D model to match that height. This permits real-time comparison of the model with images transmitted from the drone.

Figure 3:
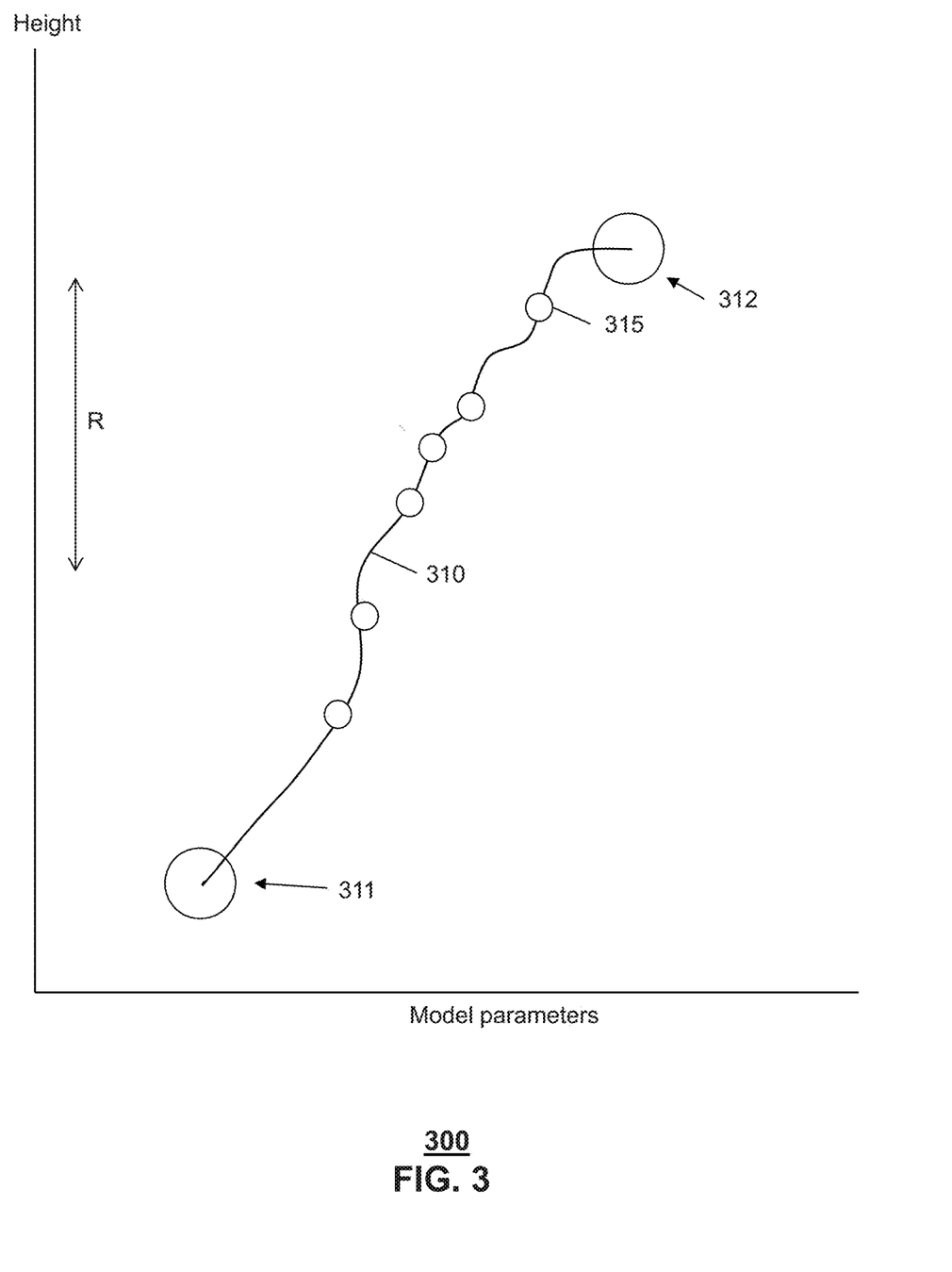
FIG. 3 schematically illustrates a SfM model, obtained using the procedure of FIG. 2, applicable over a range of heights corresponding to a drone's operating range.

FIG. 3 is a schematic illustration 300 of a non-linear path 310 on a Grassmannian manifold, in accordance with embodiments of the disclosure. The subspaces spanned by the ground-plane and aerial-plane SfM model parameters form the respective endpoints 311, 312 of the path. Points 315 on the path represent optimal rendering of SfM parameters for a particular height above ground. In an embodiment, path 310 is determined and is then incrementally sampled over the operating range R of the drone.

Figure 4:
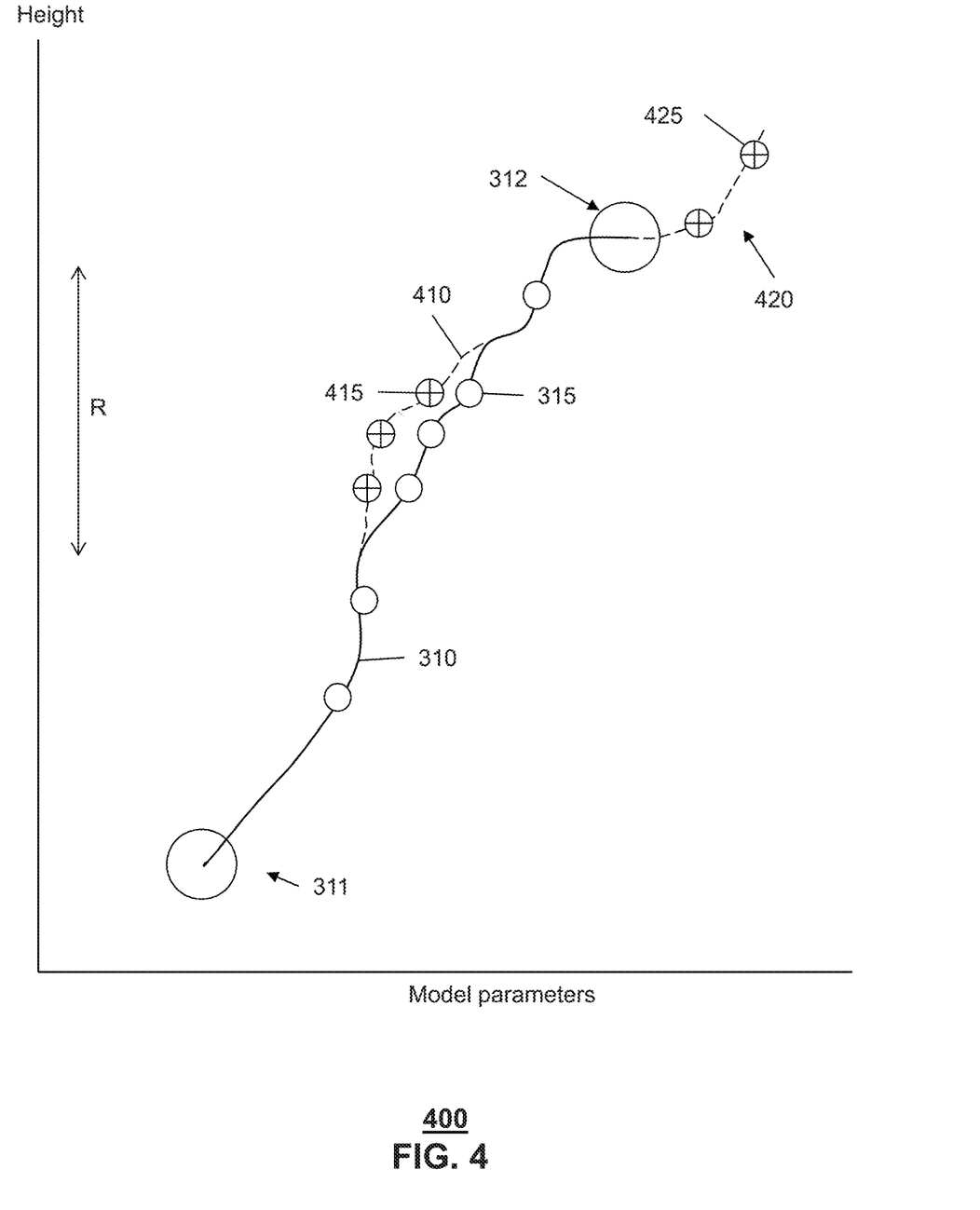
FIG. 4 schematically illustrates comparing the SfM model of FIG. 3 with images obtained by a drone, and updating the model in accordance with embodiments of the disclosure.

FIG. 4 is a schematic illustration 400 of active learning applied to the Grassmannian manifold of FIG. 3, in accordance with embodiments of the disclosure. In an embodiment, live information (a real-time 2D image) is sent by the drone and compared with SfM model parameters for the drone's operating height. The model is then recalculated to correspond with the live information. The updated model is represented by modified path 410 in FIG. 4. Points 415 along the modified path can then be sampled to determine updated SfM parameters for various heights.

In an embodiment, correspondence parameters are used to represent a correspondence between the SfM 3D model and the actual observations from the drone. As more image data is obtained from the drone, the correspondence parameters can be adjusted so that error between the drone's observations and the SfM 3D model is minimized.

In another embodiment, the path representing the 3D model can serve as a basis for estimates of a model for greater and/or lesser heights. In this embodiment, processing system 150 can apply an estimating procedure to extend the path beyond one or both of the endpoints. FIG. 4 shows modified path 415 with extension 420 representing an estimated model. In a further embodiment, if additional data is obtained for a height outside range R (e.g. represented by point 425), the optimal path can be re-calculated with a new endpoint.

Figure 5:
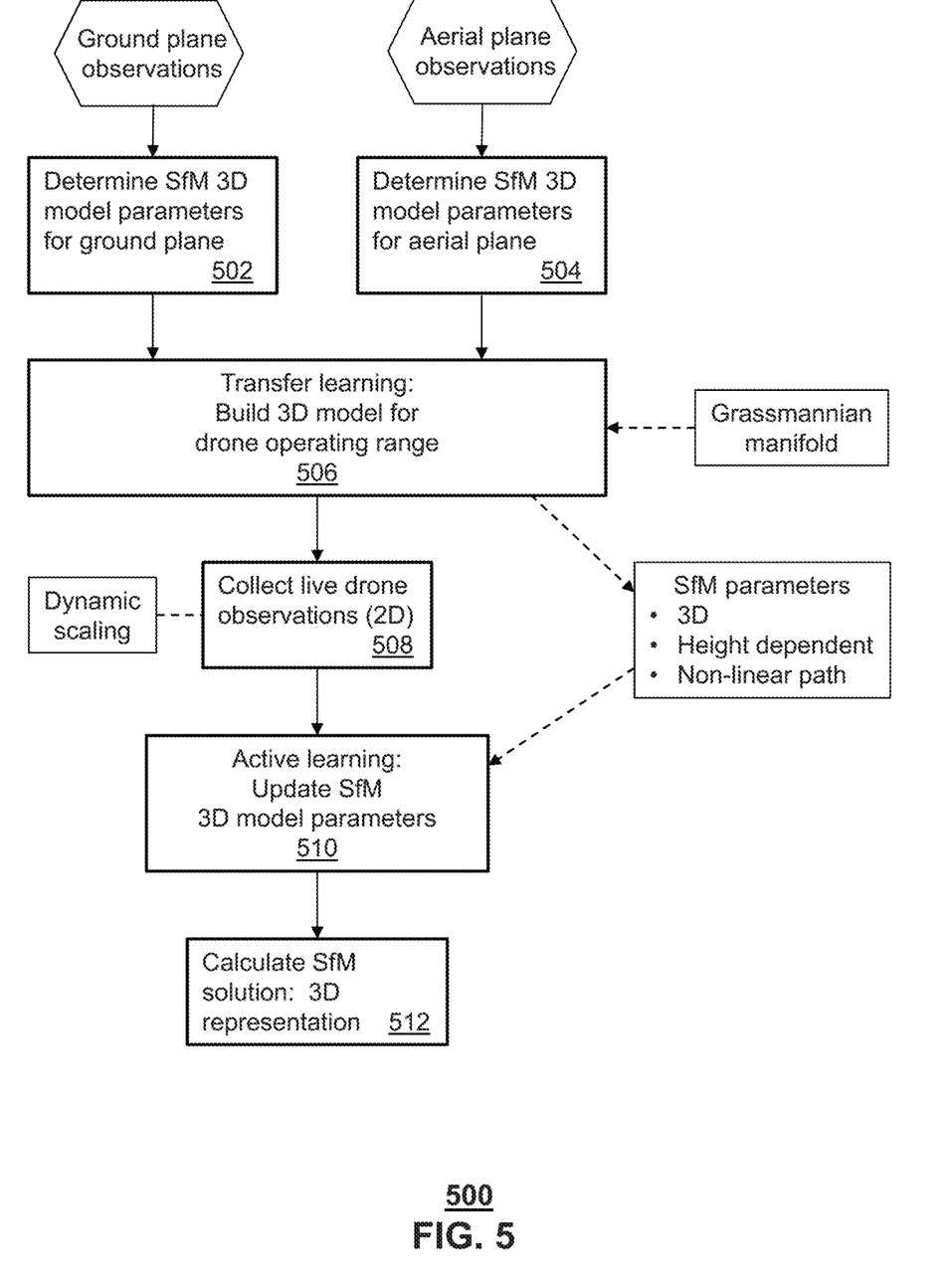
FIG. 5 depicts an illustrative embodiment of a method used in portions of the system described in FIGS. 1-2.

FIG. 5 is a flowchart depicting a method 300 used in portions of the systems described in FIGS. 1-2, in accordance with embodiments of the disclosure. In steps 502-504, SfM 3D model parameters are determined from ground-plane and aerial-plane observations respectively. A transfer learning procedure (step 506) is then used to build a 3D model, applicable to the drone's operating range, for the object of interest. In general, this 3D model is based on height-dependent SfM parameters varying in a non-linear fashion. Accordingly, in an embodiment, variation of the model with height is represented as a non-linear path on a Grassmannian manifold.

In step 508, the drone collects live data in the form of 2D images. In an embodiment, the model is dynamically scaled in accordance with the operating height of the drone. An active learning procedure (step 510) is then employed, in which the SfM 3D model parameters are updated in accordance with the image data obtained by the drone. In an embodiment, this updating is performed in real time on the dynamically scaled model. In step 512, a SfM solution is calculated based on the updated model parameters, to generate a 3D representation of the object observed by the drone.

In an embodiment, the drone is in communication with processing system 150 and has speed, altitude and direction sensors that transmit operating data to the processing system. The processing system thus can predict a new operating altitude of the UAS based on the operating data, and dynamically generate a predicted 3D representation of the structure of the object in accordance with the new operating altitude.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
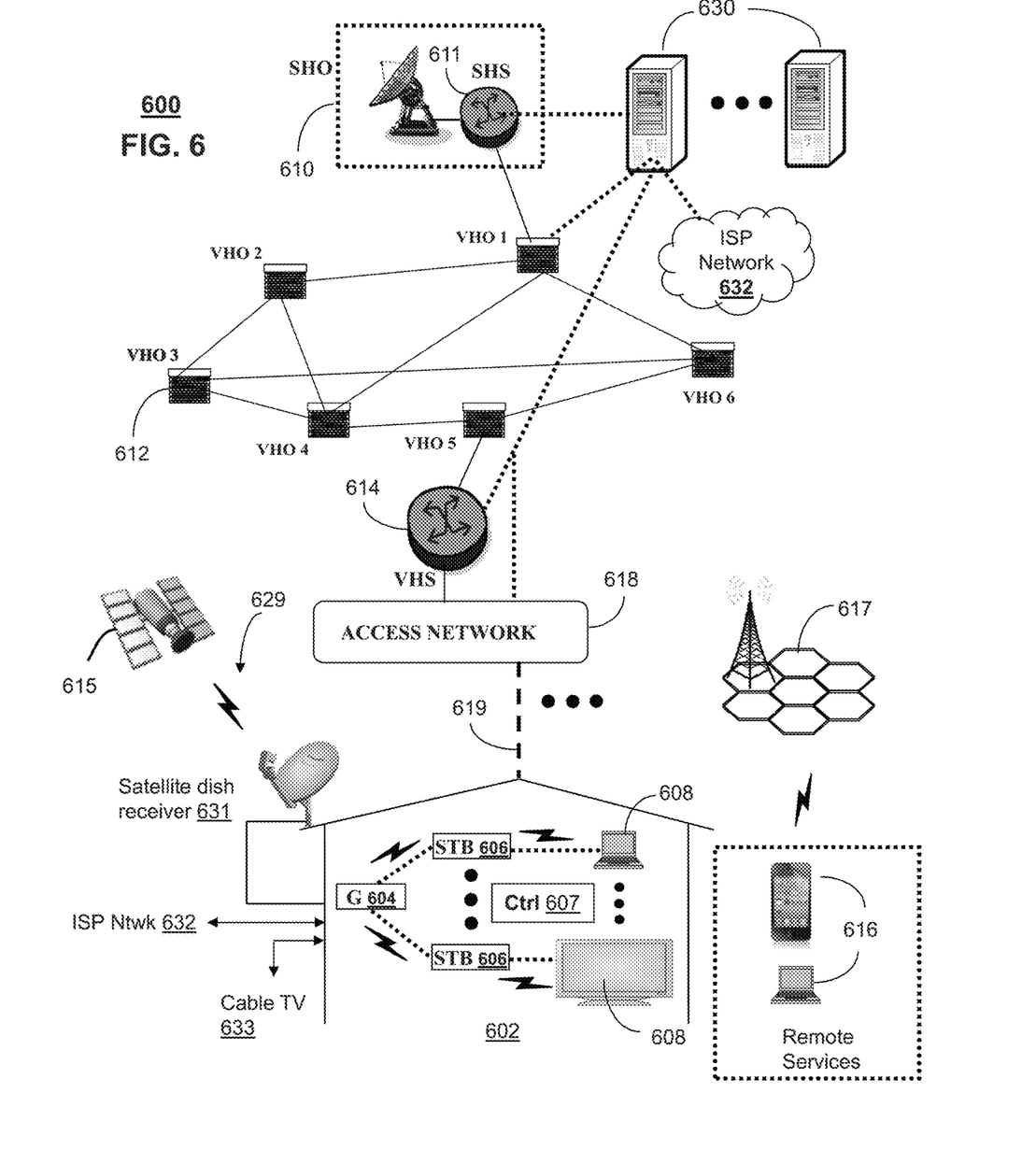
FIG. 6 depicts an illustrative embodiment of a communication system that provide media services to video processing systems of FIGS. 1-2.

FIG. 6 depicts an illustrative embodiment of a communication system 600 for providing various communication services, such as delivering media content. The communication system 600 can represent an interactive media network, such as an interactive television system (e.g., an Internet Protocol Television (IPTV) media system). Communication system 600 can be overlaid or operably coupled with the systems of FIGS. 1-2 as another representative embodiment of communication system 600. For instance, one or more devices illustrated in the communication system 600 of FIG. 6 can include a device including a processing system that includes a processor, and a memory that stores executable instructions that, when executed by the processing system, facilitate performance of operations. The operations can include obtaining a first model and a second model for a structure of an object; the models can be based respectively on a ground-level or near-ground-level observations of the object and aerial observations of the object. The operations can also include determining model parameters for a three-dimensional (3D) third model of the object based on the first model and the second model; the determining can include a transfer learning procedure using a manifold. The operations can further include obtaining data representing a third plurality of observations of the object; the data can be captured at an airborne unmanned aircraft system (UAS) operating at an altitude greater than that of the ground-level observations and less than that of the aerial observations; the data can include two-dimensional (2D) video images of the object. The operations can also include determining correspondence parameters representing a correspondence between the data and the third model; updating the correspondence parameters in accordance with the data; dynamically adjusting the third model in accordance with the operating altitude of the UAS; updating the adjusted third model in accordance with the data; and determining a 3D representation of the structure of the object, based on the updated adjusted third model.

In one or more embodiments, the communication system 600 can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol. The VHS 614 can distribute multimedia broadcast content via an access network 618 to commercial and/or residential buildings 602 housing a gateway 604 (such as a residential or commercial gateway).

The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a media content server (herein referred to as server 630). The server 630 can use computing and communication technology to direct content to the initial and target presentation devices and transmit messages, which can include among other things, transmitting the advance portion of the content, in accordance with method 500. The media processors 606 and wireless communication devices 616 can be provisioned with software functions to utilize the services of server 630. For instance, functions of media processors 606 and wireless communication devices 616 can be similar to the functions described for the devices of FIGS. 1 and 2, in accordance with method 500.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
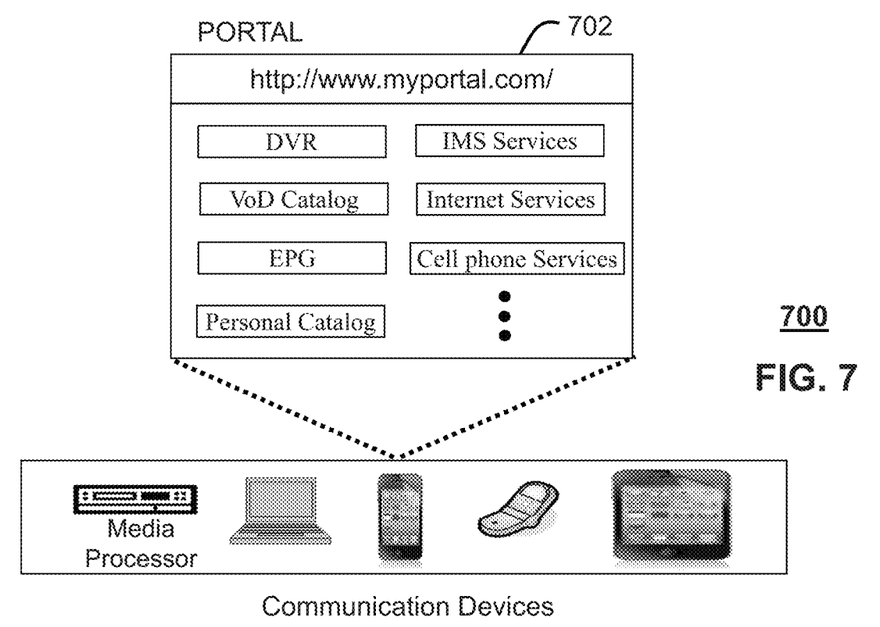
FIG. 7 depicts an illustrative embodiment of a web portal for interacting with the communication system of FIG. 6.

FIG. 7 depicts an illustrative embodiment of a web portal 702 of a communication system 700. Communication system 700 can be overlaid or operably coupled with systems 100 and 200 of FIGS. 1 and/or 2, as another representative embodiment of communication system 600. The web portal 702 can be used for managing services of systems 100 and 200 of FIGS. 1 and/or 2, and communication system 600. A web page of the web portal 702 can be accessed by a Uniform Resource Locator (URL) with an Internet browser using an Internet-capable communication device such as those described in FIGS. 1 and/or 2. The web portal 702 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 702 can also be used for provisioning Internet services, provisioning cellular phone services, and so on.

The web portal 702 can further be utilized to manage and provision software applications to adapt these applications as may be desired by subscribers and/or service providers of systems 100-200 of FIGS. 1 and/or 2, and communication system 600. Such applications can be used to extend the native sharing functions of the STB and mobile device described above. For instance, subscribers can log into their on-line accounts and provision the server 630 with contact information to enable communication with devices described in FIGS. 1 and 2. Service providers can log onto an administrator account to provision, monitor and/or maintain the systems 100-200 of FIGS. 1 and/or 2 or server 630.

Figure 8:
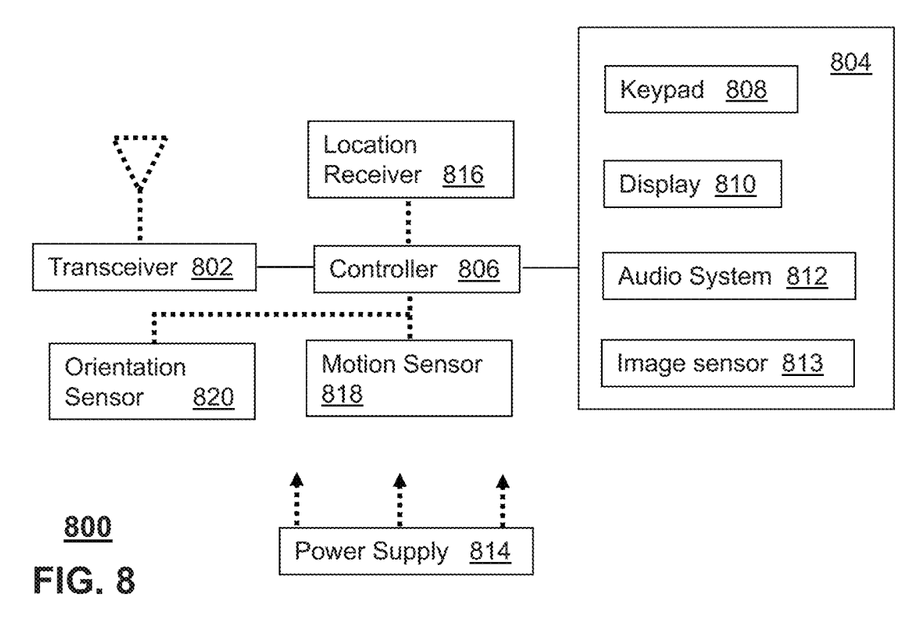
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1-2 and FIG. 6, and can be configured to perform portions of method 500 of FIG. 5.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/ GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1 and/or 2, the media processor 606, the media devices 608, or the portable communication devices 616 of FIG. 6. It will be appreciated that the communication device 800 can also represent other devices that can operate in systems of FIGS. 1 and/or 2, and in communication system 600 such as a gaming console and a media player.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
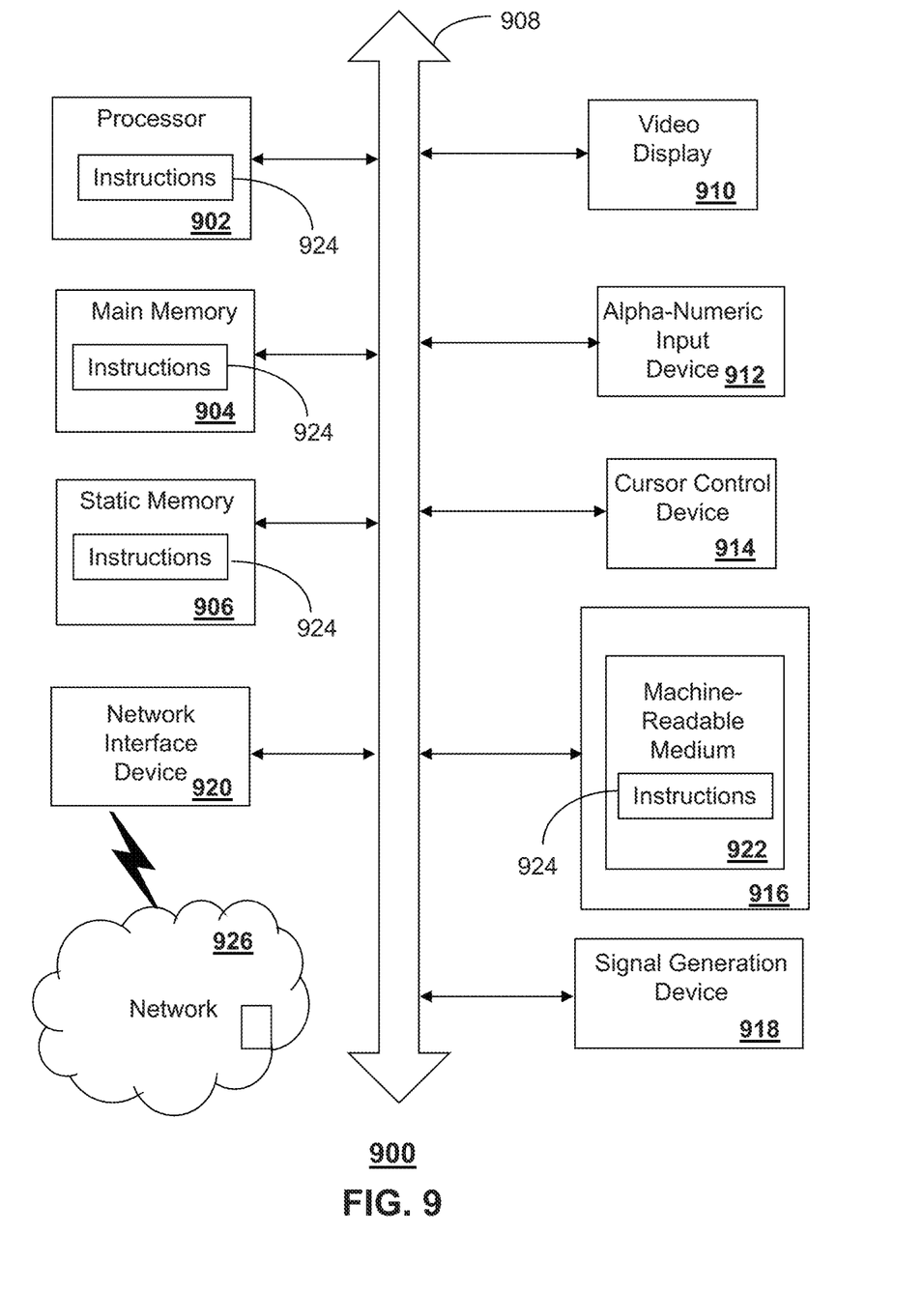
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the processing system 150 communicating with the drone 101, the server 630, the media processor 606, and other devices of FIGS. 1-2 and FIG. 6. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
obtaining, by a processing system including a processor, data representing a plurality of two-dimensional (2D) video images of an object, the video images captured at a plurality of operating altitudes using an airborne unmanned aircraft system (UAS);
constructing, by the processing system, a three-dimensional (3D) model of the object in accordance with the data, wherein the constructing comprises a transfer learning procedure using a first plurality of ground level or near-ground-level observations of the object and a second plurality of aerial observations of the object, wherein the plurality of operating altitudes are in an altitude range greater than that of the first plurality of observations and less than that of the second plurality of observations; and
dynamically adjusting, by the processing system, the 3D model in accordance with updated data representing a new video image captured at a new operating altitude of the UAS.

2. The method of claim 1, wherein the altitude range is from about 100 feet to about 2000 feet.

3. The method of claim 1, further comprising:
predicting, by the processing system, a future operating altitude of the UAS; and
determining, by the processing system, a predicted 3D model of the object in accordance with the predicted future operating altitude.

4. The method of claim 1, wherein the 3D model is based on parameters varying non-linearly with an operating altitude of the UAS, and wherein variation of the 3D model with the operating altitude corresponds to a non-linear path on a manifold.

5. The method of claim 4, wherein the parameters comprise structure-from-motion (SfM) model parameters for the altitude range.

6. The method of claim 5, further comprising obtaining, by the processing system, the parameters using a machine-learning algorithm.

7. The method of claim 4, wherein the manifold is a Grassmannian manifold.

8. The method of claim 4, wherein the non-linear path has a first endpoint corresponding to a first model of the object based on the first plurality of observations and a second endpoint corresponding to a second model of the object based on the second plurality of observations.

9. The method of claim 1, further comprising:
determining, by the processing system, correspondence parameters representing a correspondence between the data and the 3D model; and
updating, by the processing system, the correspondence parameters in accordance with the data.

10. The method of claim 9, wherein updating the correspondence parameters comprises adjusting, by the processing system, the correspondence parameters to reduce an error between the 3D model and the data.

11. The method of claim 1, wherein the 3D model is adjusted in real time, and wherein the adjusting comprises comparing the 3D model with live video images of the object.

12. A device comprising:
a processing system including a processor; and
a memory that stores executable instructions that, when executed by the processing system, facilitate performance of operations comprising:
obtaining data representing a plurality of two-dimensional (2D) video images of an object, the video images captured at a plurality of operating altitudes using an airborne unmanned aircraft system (UAS);
constructing a three-dimensional (3D) model of the object in accordance with the data, wherein the constructing comprises a transfer learning procedure using a first plurality of ground level or near-ground-level observations of the object and a second plurality of aerial observations of the object; and
dynamically adjusting, by the processing system, the 3D model in accordance with updated data representing a new video image captured at a new operating altitude of the UAS,
wherein the 3D model is adjusted in real time, and wherein the adjusting comprises comparing the 3D model with live video images of the object.

13. The device of claim 12, wherein the plurality of operating altitudes are in an altitude range greater than that of the first plurality of observations and less than that of the second plurality of observations.

14. The device of claim 13, wherein the 3D model is based on parameters varying non-linearly with an operating altitude of the UAS, and wherein variation of the 3D model with the operating altitude corresponds to a non-linear path on a manifold.

15. The device of claim 14, wherein the non-linear path has a first endpoint corresponding to a first model of the object based on the first plurality of observations and a second endpoint corresponding to a second model of the object based on the second plurality of observations.

16. The device of claim 14, wherein the parameters comprise structure-from-motion (SfM) model parameters for the altitude range, and wherein the parameters are obtained using a machine-learning algorithm.

17. A non-transitory machine-readable medium comprising executable instructions that, when executed by a processing system including a processor, facilitate performance of operations comprising:

obtaining data representing a plurality of two-dimensional (2D) video images of an object, the video images captured at a plurality of operating altitudes using an airborne unmanned aircraft system (UAS);

constructing a three-dimensional (3D) model of the object in accordance with the data, wherein the constructing comprises a transfer learning procedure using a first plurality of ground level or near-ground-level observations of the object and a second plurality of aerial observations of the object, wherein the plurality of operating altitudes are in an altitude range greater than that of the first plurality of observations and less than that of the second plurality of observations, wherein the 3D model is based on parameters varying non-linearly with an operating altitude of the UAS, and wherein variation of the 3D model with the operating altitude corresponds to a non-linear path on a manifold; and dynamically adjusting the 3D model in accordance with updated data representing a new video image captured at a new operating altitude of the UAS.

18. The non-transitory machine-readable medium of claim 17, wherein the manifold is a Grassmannian manifold.

19. The non-transitory machine-readable medium of claim 17, wherein the non-linear path has a first endpoint corresponding to a first model of the object based on the first plurality of observations and a second endpoint corresponding to a second model of the object based on the second plurality of observations.

20. The non-transitory machine-readable medium of claim 17, wherein the parameters comprise structure-from-motion (SfM) model parameters for the altitude range, and wherein the parameters are obtained using a machine-learning algorithm.

* * * * *